United States Patent
Cummins et al.

(10) Patent No.: US 12,478,399 B1
(45) Date of Patent: Nov. 25, 2025

(54) METHOD OF TREATING A BLOOD VESSEL IN A SUBJECT

(71) Applicant: Invera Medical Limited, Galway (IE)

(72) Inventors: Sean Cummins, County Limerick (IE); Stephen Cox, Westport (IE); Nigel Phelan, County Galway (IE)

(73) Assignee: Invera Medical Limited, Galway (IE)

( * ) Notice: Subject to any disclaimer, the term of this patent is extended or adjusted under 35 U.S.C. 154(b) by 0 days.

(21) Appl. No.: 18/999,393

(22) Filed: Dec. 23, 2024

(51) Int. Cl.
*A61B 17/00* (2006.01)
*A61B 17/12* (2006.01)
*A61B 17/32* (2006.01)

(52) U.S. Cl.
CPC ........ *A61B 17/32* (2013.01); *A61B 17/00234* (2013.01); *A61B 17/12036* (2013.01); *A61B 17/12136* (2013.01); *A61B 2017/00238* (2013.01); *A61B 2017/00305* (2013.01); *A61B 2017/00557* (2013.01); *A61B 2017/00778* (2013.01); *A61B 2017/00893* (2013.01); *A61B 2017/320004* (2013.01); *A61B 2217/007* (2013.01)

(58) Field of Classification Search
CPC .......... A61B 17/00008; A61B 17/3205; A61B 17/3207; A61B 17/320758; A61B 2017/320004; A61B 2017/320008; A61B 2017/320012; A61B 2017/320733; A61B 2017/320741; A61B 17/320708; A61B 17/320725; A61M 2025/1086; A61M 2025/109
See application file for complete search history.

(56) References Cited

U.S. PATENT DOCUMENTS

| | | | |
|---|---|---|---|
| 9,782,562 B2 * | 10/2017 | Hobbs | A61B 17/12109 |
| 11,696,793 B2 | 7/2023 | Anderson et al. | |
| 2019/0350567 A1 * | 11/2019 | Cummins | A61B 17/00008 |

OTHER PUBLICATIONS

Kabnick LS, Sadek M, Bjarnason H, Coleman DM, Dillavou ED, Hingorani AP, et al. Classification and treatment of endothermal heat-induced thrombosis: Recommendations from the American Venous Forum and the Society for Vascular Surgery. J Vasc Surg Venous Lymphat Disord. Jan. 2021;9(1):6-22.

(Continued)

*Primary Examiner* — Deanna K Hall
(74) *Attorney, Agent, or Firm* — Bookoff McAndrews, PLLC

(57) ABSTRACT

A method of treating a blood vessel in a subject comprises the steps of advancing a catheter device comprising a deployable abrasive element distally across a treatment zone in the vessel, deploying the abrasive element into contact with the vessel wall, actuating the abrasive element to cause disruption of the vessel wall and exposure of subendothelial layers of the vessel wall at the treatment zone, infusing a sclerosant agent into the blood vessel via the catheter to contact and induce cellular necrosis in the exposed subendothelial layers of the vessel wall, recapturing the abrasive element by the catheter device, and withdrawing the catheter device from the vessel. The method may comprise an additional step of inducing vasospasm of the treatment zone of the vessel prior to disruption of the vessel wall by administering a stimulus to the vessel wall by the catheter device.

24 Claims, 13 Drawing Sheets

(56) References Cited

OTHER PUBLICATIONS

Connor DE, Cooley-Andrade O, Goh WX, Ma DDF, Parsi K. Detergent sclerosants are deactivated and consumed by circulating blood cells. Eur J Vasc Endovasc Surg. Apr. 2015;49(4):426-31.

Parsi K. Paradoxical embolism, stroke and sclerotherapy. Phlebology. Jun. 2012;27(4):147-67.

Hill D, Hamilton R, Fung T. Assessment of techniques to reduce sclerosant foam migration during ultrasound-guided sclerotherapy of the great saphenous vein. J Vasc Surg. Oct. 2008;48(4):934-9.

Lane TRA, Moore HM, Franklin IJ, Davies AH. Retrograde inversion stripping as a complication of the ClariVein mechanochemical venous ablation procedure. Ann R Coll Surg Engl. Mar. 2015;97(2):e18-20.

Morrison N. Regarding "Balloon control of the saphenofemoral junction during foam sclerotherapy: proposed innovation." J Vasc Surg. Mar. 2008;47(3):693.

Heger M, van Golen RF, Broekgaarden M, van den Bos RR, Neumann Ham, van Gulik TM, et al. Endovascular laser-tissue interactions and biological responses in relation to endovenous laser therapy. Lasers Med Sci. Mar. 1, 2014;29(2):405-22.

\* cited by examiner

METHOD OF TREATING A BLOOD VESSEL IN A SUBJECT

TECHNICAL FIELD

The present invention relates to a method of treating a blood vessel in a subject, especially a varicose vein.

BACKGROUND TO THE DISCLOSURE

Varicose veins, a common manifestation of chronic venous disease (CVD), are dilated and tortuous veins that result from structural changes in the vessel wall, venous valve incompetence, and abnormal blood reflux. These veins are associated with symptoms ranging from heaviness, aching, and swelling to more severe complications such as skin discoloration, irritation, and ulceration. While the exact cause of varicose veins remains unclear, genetic predisposition leading to weaknesses in the vein walls and valves is a significant factor in their development.

Most commonly found in the superficial venous network of the lower extremities, varicose veins primarily affect the great saphenous vein (GSV) and the small saphenous vein (SSV), which drain blood from the skin and subcutaneous tissues to the deep venous system. The GSV, running from the ankle to the groin, and the SSV, extending from the ankle to the posterior knee, are commonly effected by abnormal reflux. Both veins connect to the deep venous network, where valves ensure the proper direction of blood flow toward the heart. When these valves become incompetent, blood refluxes in the wrong direction, exacerbating venous insufficiency and further dilating the veins leading to venous hypertension in the lower limb.

The structural characteristics of veins, including thinner walls and higher compliance compared to arteries, contribute to their susceptibility to dilation under increased venous pressure. The saphenous vein, for example, has a wall thicknesses ranging from 200 to 700 micrometres and consists of three layers: the tunica intima, media, and adventitia. However, unlike arteries, these layers are more compliant and less muscular, making the veins prone to varicosities. The endothelial layer is covered by a protective glycocalyx, which shields it from shear forces, and the smooth muscle cells within the media provide some structural support.

Varicose veins are among the most prevalent peripheral vascular disorders, affecting up to 40% of the adult population. Contributing risk factors include age, family history, obesity, and a sedentary lifestyle. In response to the significant impact on quality of life, a variety of treatment options have been developed, ranging from conservative measures such as compression therapy to more invasive surgical and catheter-based interventions. In the United States alone, approximately 750,000 to 900,000 procedures are performed annually for the treatment of varicose veins and chronic venous disease (CVD).

Despite the advancements in endovenous technologies for treating superficial reflux and CVD there remains a significant unmet need for less invasive treatments that retain high long term efficacy rates. Endovenous ablation technologies are classified as thermal or non-thermal in their principle of operation. Thermal-based treatments, while effective, are associated with complications such as nerve damage, particularly when treating veins located below the knee or close to skin ulcers. Even with tumescent anesthesia, which creates a cushion of fluid around the vein to prevent damage to nearby tissues, complications including nerve injury and hematoma formation remain significant concerns. Additionally, the risk of endothermal heat-induced thrombosis (EHIT) and related thromboembolic complications like deep vein thrombosis (DVT) and pulmonary embolism (PE) are inherent in thermal treatments, as heat can be conducted downstream of the target vein and into the deep venous circulation (1).

In response to these limitations, non-thermal, non-tumescent (NTNT) techniques have been developed to provide a less invasive treatment approach. These methods, which include sclerotherapy and cyanoacrylate glue embolization, are less painful, eliminate the need for tumescent anesthesia, and can be performed in office settings, where the majority of varicose vein procedures now take place.

Sclerotherapy describes a group of techniques which involve infusion of a substance into the vein lumen to cause cellular necrosis in the endothelial and media layers thereby inducing a fibrotic inflammatory response which results in resolution of abnormal reflux by fibrotic vein wall remodelling processes. Substances used as sclerosants are generally classified as chemical or osmotic, with different respective mechanisms of inducing cellular necrosis.

Chemical sclerosants are detergent chemicals with amphiphilic properties. The most commonly used agents are Sodium Tetradecyl Sulphate (STS) and Polidocanol (POL). These agents contact the lipid bilayer of cell membranes upon infusion into the vein lumen. Their detergent action disrupts the lipid bilayer and induces cellular necrosis. The detergent molecules are deactivated or "consumed" after they contact the vein endothelial surface and in addition by contact with specific constituents of blood including red blood cell membranes and albumin. This deactivation is important for both safety and efficacy considerations. In terms of safety, it is beneficial for the chemical sclerosant to be deactivated within the target treatment vein before it reaches the deep venous system. Significant disruption of the endothelium of the deep venous system, such as in the femoral vein, can result in venous thromboembolic (VTE) complications such as pulmonary embolism (PE) and deep vein thrombosis (DVT). In terms of efficacy, if deactivation occurs too quickly in the target vein, the endothelium and deeper media layers will not undergo sufficient cellular necrosis to induce the required inflammatory response leading to potential technical failures in treatment. Increasing the dose of chemical sclerosant correlates to increased efficacy but is also associated with a higher VTE complication rate. There is typically a maximum recommended daily dosage of chemical sclerosants based on pharmacokinetic studies of the active ingredient. In larger incompetent veins, especially >6 mm in diameter measured in the standing position, the efficacy of chemical sclerosants can be relatively low due to dilution effects of blood and circulation despite the use of the maximum allowed dose. The other potential complication of using chemical sclerosant is allergic reactions. Systemic severe allergic reactions are very rare but can result in significant morbidity and death (2).

Osmotic sclerosants include hypertonic saline and high concentration dextrose. It is thought that following infusion these agents induce cellular disruption due to osmotic shifts in intracellular fluid. Osmotic sclerosants do not carry the same risk of allergic reactions as chemical sclerosants but they are less effective and have a low rate of technical success in larger veins >4 mm.

The ideal sclerotherapy procedure would achieve high efficacy in terms of resolution of reflux with a low rate of complications related to downstream effects such as VTE. Higher efficacy with lower concentrations of chemical sclerosant or equivalent efficacy using osmotic sclerosants would offer significant benefits in terms of safety compared with the current standard of care.

The development of foam sclerotherapy involves the formation of a foam emulsion with chemical sclerosant and a gas such as room air or a physiological mixture with higher nitrogen content. Foam sclerotherapy improves the contact of the chemical agent with the cells in the target vein by forming a column of foam (microbubble emulsion) that can expel blood from within the target vein, thus reducing the early deactivation of chemical and slowing the dilution in the circulation. The disadvantage of foam sclerotherapy is the additional risk associated with infusion of air in the emulsion. This can result in air embolization and neurological side effects such as headache, visual disturbances, transient ischaemic attack and stroke (3). Foamed emulsions can also migrate into the deep venous system via the sapheno-fermoral junction or other perforator vein junction points before they undergo deactivation. This can result in a higher rate of VTE related complications (4).

To address these limitations, mechanical actions have been combined with chemical sclerosants to improve their distribution and efficacy. Combined mechanical action and chemical ablation pairs the chemical action of sclerosants with mechanical disruption of the vein wall to enhance the spread of the sclerosant and encourage venospasm, which reduces vein diameter and improves treatment outcomes. However, while mechanical and chemical ablation may improve sclerosant distribution within the vein lumen, histological studies show that the mechanical component of current mechanical-chemical treatments has a low impact on the integrity of endothelial cells and very low impact on cells in the media layer. Efficacy rates of these treatments are currently still lower than thermal techniques. Current Mechanochemical devices can cause significant intraprocedural patient pain, discomfort, bruising, and rarely inadvertent vein stripping due to the mechanical elements catching on the vein wall or valves (5).

Other devices have been developed which use balloon occlusion of the sapheno-fermoral junction to prevent complications related to migration of active sclerosant into the deep system. Segmental balloon occlusion has also been proposed as a method to aspirate blood from target zones and further prevent deactivation. While the theory of these methods is logical in terms of reducing deactivation by blood, their implementation involves complicated steps which reduces their practical usefulness (6). Correctly sizing the balloons to achieve successful isolation of vein segments can be technically challenging. There is significant increased cost also involved in the incorporation of balloon occlusion systems in chemical sclerosant infusion devices.

Given these challenges, there is a clear unmet need for improved sclerotherapy methods which offer safe, effective and inexpensive treatments. By increasing the efficacy of the injected sclerosant, the required dose of chemical sclerosant can be reduced or there is a potential to use osmotic sclerosants which carry lower risks.

A targeted mechanical approach that exposes the subendothelial layers of the vessel, particularly the media layer, to the infused chemical sclerosant could significantly enhance the effect of sclerosant by allowing more chemically mediated cellular necrosis to occur in the media layer which is a known stimulus for a specific form of inflammatory response that results in negative remodelling and long-term occlusion of the vessel (7). Infusion of the chemical sclerosant directly to the vessel surface immediately following the mechanical preparation step could further enhance the safety and efficacy of the procedure and address the limitations of current NTNT techniques, offering a more viable alternative to thermal-based treatments. This would be particularly beneficial for patients with advanced chronic venous disease, such as those with venous ulcers, where traditional thermal methods carry additional risks and challenges.

Mechanical stimulation of blood vessels is also known to induce venospasm. Venospasm reduces the diameter of veins through contraction of circular muscle fibres in the media layer of the vein wall. This reduces the effective volume and flow rates in the target vein, without the need for balloon occlusion or other temporary or permanently implanted devices.

Spasm in a target vessel can occur in response to local or systemic stimuli. A systemic stress response to the anticipation of undergoing a procedure by a patient can occur but is unreliable and may not occur consistently in all patients. Local stimuli including cold temperature stimulus to overlying skin can also induce spasm but is uncomfortable for patients and the spasm response can be unpredictable. Chemical stimulation can cause spasm in the vessel and this can be induced by infusion of a sclerosant agent, however, the vasospasm response may be delayed whereby the chemical has already been diluted in circulation before the spasm has occurred. Mechanical stimulation through stretching of the vessel wall and abrasion of vessel wall layers is a more reliable way to induce spasm and can be performed at the beginning of the procedure as an initial step to induce spasm prior to subsequent mechanical ablation steps and/or infusion of sclerosant steps in the procedure.

Devices and methods for mechanical and chemical ablation are described in the following documents:

U.S. Pat. No. 11,696,793 B2 discloses a device for mechanical agitation of a vessel with a control mechanism for automated infusion of a sclerosing agent. It also discloses methods for temporary balloon occlusion to isolate target sections of the vein. This device does not allow for specific infusion of sclerosant into the media layer and/or timed induction of spasm in synchronization with infusion of sclerosant and mechanical ablation.

It is an object of the invention to overcome at least one of the above-referenced problems.

SUMMARY

In a first aspect, there is provided a method of treating a blood vessel in a subject, comprising the steps of:
  advancing a catheter device comprising a deployable abrasive element distally across a treatment zone in the vessel;
  deploying the abrasive element into contact with the vessel wall;
  actuating the abrasive element to cause disruption of the vessel wall and exposure of subendothelial layers of the vessel wall at the treatment zone;
  infusing a sclerosant agent into the blood vessel via the catheter to contact and induce cellular necrosis in the exposed subendothelial layers of the vessel wall;
  recapturing the abrasive element by the catheter device; and
  withdrawing the catheter device from the vessel.

In any embodiment, the method comprises an additional step of inducing vasospasm of the treatment zone of the vessel prior to disruption of the vessel wall by administering a stimulus to the vessel wall.

In any embodiment, the stimulus comprises manual compression on the skin to further engage the abrasive element with the vessel wall. Manual compression may be applied while the In any embodiment, the stimulus is administered to the vessel wall by the catheter device.

In any embodiment, the stimulus comprises delivery of a chemical stimulant to the vessel wall by the catheter device.

In any embodiment, the stimulus comprises delivery of a thermal stimulant to the vessel wall by the catheter device In any embodiment, the stimulus comprises delivery of an electrical stimulant to the vessel wall by the catheter device.

In any embodiment, the method comprises a step of infusing a sclerosant agent into the blood vessel via the catheter device prior to disruption of the vessel wall.

In any embodiment, the method comprises a step of infusing a sclerosant agent into the blood vessel via the catheter device during disruption of the vessel wall.

In any embodiment, the step of infusing the sclerosant is performed within 1 to 10 minutes after actuation of the abrasive element.

In any embodiment, the step of actuating the abrasive element comprises withdrawal of the deployed abrasive element along the treatment zone.

In any embodiment, the method comprises infusing the sclerosant agent into the blood vessel via an outlet disposed on a tip of the catheter device.

In any embodiment, the method comprises infusing the sclerosant agent into the blood vessel via outlets disposed on a sidewall of a distal end of the catheter device.

In any embodiment, the method comprises delivering the sclerosant agent from an outlet of the catheter device as a pressurised jet.

In any embodiment, the method comprises delivering the pressurised jet in a direction that is normal to a surface of the vessel wall.

In any embodiment, the method comprises delivering the pressurised jet in a direction that is not normal to a surface of the vessel wall.

In any embodiment, the method comprises an additional step of inducing vasospasm of the vessel at a distal location distant to the treatment zone prior to disruption of the vessel wall.

In any embodiment, the blood vessel being treated is a vein.

In any embodiment, the distal location distant to the treatment zone is selected from the Great Saphenous Vein (GSV) of the lower limb and a junctional point with the deep venous circulation, including the saphenofemoral junction and junctions of perforator veins.

In any embodiment, the method comprises delivering sclerosant to the vessel via the abrasive element of the catheter device.

In any embodiment, the step of actuating the abrasive element comprises withdrawing the deployed abrasive element proximally across all or part of the treatment zone.

In any embodiment, the method comprises infusing the sclerosant at or adjacent to a proximal end of the treatment zone, wherein the infused sclerosant tracks proximally across the treatment zone and penetrates the exposed subendothelial layers of the vessel wall.

In any embodiment, the method comprises reducing a volume of a lumen of the treatment zone of the blood vessel by deploying a volume occupying body in the lumen of the treatment zone to create a residual lumen, in which the infusion step comprises infusing sclerosant into the residual lumen.

In any embodiment, the residual lumen is an annular lumen.

In any embodiment, the volume occupying body is an inflatable balloon.

In any embodiment, the infusion step comprises infusing sclerosant into the residual lumen at or adjacent to a distal end of the residual lumen.

In any embodiment, the infusion step comprises infusing sclerosant into the residual lumen via fluidic channels in the volume occupying body.

In any embodiment, the method comprises a step of infusing a physiological neutral solution (e.g. saline) into the treatment zone of the blood vessel after disruption of the vessel wall and prior to or during the infusion of the sclerosant.

In any embodiment, infusion of the sclerosant comprises withdrawing the catheter device proximally across the treatment zone while simultaneously infusing sclerosant along the treatment zone from a distal end of the catheter device and infusing saline along the treatment zone ahead of the infusion of sclerosant In any embodiment, the sclerosant and saline are infused simultaneously.

In any embodiment, the sclerosant and saline are each, independently, infused continuously or intermittently during withdrawal of the catheter device.

In any embodiment, the method comprises a step of recirculation of infused sclerosant by the catheter device to the treatment zone from a location in the blood vessel proximal to the treatment zone.

In any embodiment, the method comprises a step of infusing sclerosant agent at a secondary treatment zone proximal of the treatment zone.

In any embodiment, the secondary treatment zone comprises a blood vessel junction.

Also described is a method of treating venous reflux in a vein in a subject to cause thrombotic occlusion of the vein and subsequent fibrotic closure by the inflammatory response to endothelial and media layer disruption comprising mechanically or chemically treating the vein to cause a treatment zone of the vein to venospasm, and mechanically and circumferentially denuding the treatment zone of the vein during venospasm of the vein including disruption of the endothelial and medial layers of the vein.

In any embodiment, the vein is a superficial vein.

In any embodiment, the method comprises infusing a sclerosant agent into the vein to contact and induce cellular necrosis in the exposed subendothelial layers of the vein wall.

Also described is a method of treating venous reflux in a vein in a subject to cause thrombotic occlusion of the vein and subsequent fibrotic closure by the inflammatory response to endothelial and media layer disruption comprising mechanically and circumferentially denuding the treatment zone of the vein including disruption of the endothelial and medial layers of the vein and infusing a sclerosant agent into the vein to contact and induce cellular necrosis in the exposed subendothelial layers of the vein wall.

In any embodiment, the vein is a superficial vein.

In any embodiment, the method comprises mechanically or chemically treating the vein to cause venospasm in the treatment zone of the vein prior to mechanically and circumferentially denuding the treatment zone of the vein.

Also described is a method of treating a varicose vein in a subject by denuding a lumen of the varicose vein to cause thrombotic occlusion of the varicose vein and subsequent fibrotic closure by the inflammatory response to endothelial and media layer disruption, comprising:

advancing a device distally across a treatment zone in the varicose vein, wherein the device comprises an elongated catheter having a lumen and a distal end, and a radially expansible treatment element disposed in the lumen and configured for axial movement relative to the catheter;

deploying the radially expansible treatment element out of the distal end of the catheter to radially expand at a distal end of the treatment zone;

withdrawing the deployed radially expansible treatment element proximally along the treatment zone of the varicose vein to cause venospasm in the treatment zone;

recapturing the radially expansible treatment element into the lumen of the elongated catheter;

re-advancing the device distally across a treatment zone in the varicose vein, re-deploying the radially expansible treatment element out of the distal end of the catheter to radially expand at a distal end of the treatment zone;

withdrawing the deployed radially expansible treatment element proximally along the treatment zone of the varicose vein with the treatment element circumferentially impressed against the lumen of the varicose vein to mechanically and circumferentially denude at least a 10 cm length of the treatment zone of the varicose vein;

recapturing the radially expansible treatment element into the lumen of the elongated catheter; and withdrawing the device from the treated varicose vein.

In any embodiment, the first withdrawing step comprises partial contact between the radially expansible treatment element and the lumen of the vein and the second withdrawing step comprises increased (or complete) contact between the radially expansible treatment element and the lumen of the vein due to the vein being in (partial or complete) venospasm.

Also described is a method comprising:
advancing a device distally across a treatment zone of a blood vessel, wherein the device comprises an elongated catheter having a lumen and a distal end, and a radially expansible treatment element disposed in the lumen and configured for axial movement relative to the catheter;

deploying the radially expansible treatment element out of the distal end of the catheter to radially expand at a distal end of the treatment zone;

withdrawing the deployed radially expansible treatment element proximally along the treatment zone of the varicose vein to cause the treatment zone to venospasm;

recapturing the radially expansible treatment element into the lumen of the elongated catheter;

re-advancing the device distally across a treatment zone in the varicose vein, re-deploying the radially expansible treatment element out of the distal end of the catheter to radially expand at the distal end of the treatment zone;

withdrawing the deployed radially expansible treatment element proximally along the treatment zone of the varicose vein with the treatment element circumferentially impressed against the lumen of the varicose vein to mechanically and circumferentially denude the treatment zone of the varicose vein;

recapturing the radially expansible treatment element into the lumen of the elongated catheter; and withdrawing the device from the treated varicose vein.

In any embodiment, the radially expansible treatment element or abrasive element is a helical coil configured for self-deployment from a delivery configuration to a radially expanded deployed configuration that, in use, circumferentially impresses against a lumen of the blood vessel.

In any embodiment, the sclerosant enters a space created by disruption of the vessel wall and propagates beyond the space between tissue planes formed by intrinsic layers of the vein wall though a process of hydro-dissection or cell lysis.

Also described is a medical device to treat a blood vessel in a subject, comprising:
an elongated catheter having a lumen and a distal end;
an abrasive element disposed in the lumen and configured for axial movement relative to the catheter to cause disruption of the vessel wall and exposure of subendothelial layers of the vessel wall at the treatment zone;
a fluidic conduit having an outlet at or adjacent to the distal end of the catheter; and
an injector fluidically connected to the fluidic conduit and configured to deliver a fluid out of the outlet of the fluidic conduit upon actuation.

In any embodiment, the abrasive element is a helical coil configured for deployment from a delivery configuration to a radially expanded deployed configuration that, in use, circumferentially impresses against a lumen of the blood vessel.

In any embodiment, the outlet is disposed at a distal tip of the elongated catheter.

In any embodiment, the fluidic conduit comprises one or a plurality of outlets disposed on a sidewall of a distal end of the elongated catheter.

In any embodiment, the medical device comprises an actuator for the injector configured to actuate the injector to deliver fluid out of the outlet selected.

In any embodiment, the medical device comprises a sensor disposed on the distal end of the catheter to sense a parameter(s) selected from vessel wall pressure, vessel intraluminal pressure, electrical impedance of vessel wall and/or intra-luminal fluid, vessel diameter and axial movement of the elongated catheter relative to the vessel.

In any embodiment, the medical device comprises a processor configured to receive as inputs the length of the treatment zone of the vein and the diameter of the treatment zone of the vein, the vessel diameter during the procedure as measured using intrinsic catheter imaging (e.g. Intravascular ultrasound) or external imaging (e.g. external ultrasound probe), calculate the target volume and concentration of sclerosant required to be delivered to the treatment zone via the delivery catheter, and provide an output to the actuator to deliver the target volume of sclerosant via the injector and delivery catheter.

In any embodiment, the medical device comprises a graphical user interface to allow data to be input into the processor.

In any embodiment, the processor is operably coupled to the sensor.

In any embodiment, the outlet is configured to direct the fluid out of the outlet at an angle of 20° to 80° to a longitudinal axis of the elongated catheter.

In any embodiment, the fluidic conduit is disposed within the radially expansible treatment element.

In any embodiment, the medical device comprises a volume occupying body configured for axial movement along the lumen of the elongated catheter and adjustment between a contracted delivery configuration and a deployed radially expanded configuration.

In any embodiment, the volume occupying body comprises the fluidic conduit.

In any embodiment, the volume occupying body is an inflatable balloon.

In any embodiment, the medical device comprises a second fluidic conduit having an outlet at or adjacent to the distal end of the catheter.

In any embodiment, the outlet of the second fluidic conduit is configured to direct a fluid proximally.

In any embodiment, the medical device comprises a fluid recirculation system comprising a fluid inlet disposed on the distal end of the catheter spaced-apart from the outlet and a pump to Also described is a medical device to treat a blood vessel in a subject, comprising: an elongated catheter having a lumen and a distal end;

an abrasive element disposed in the lumen and configured for axial movement relative to the catheter to cause disruption of the vessel wall and exposure of subendothelial layers of the vessel wall at the treatment zone;

a fluidic conduit having an outlet at the distal end of the catheter; and an injector fluidically connected to the fluidic conduit and configured to deliver a fluid out of the outlet of the fluidic conduit upon actuation;

a controller for the injector configured to control a parameter of the injection of the fluid out of the outlet selected from a volume or rate of delivery of the fluid; and a sensor disposed on the distal end of the catheter to sense a parameter selected from vessel wall pressure, vessel intra-luminal pressure, electrical impedance of vessel wall and/or intra-luminal fluid, vessel diameter and axial movement of the elongated catheter relative to the vessel wall.

Other aspects and preferred embodiments of the invention are defined and described in the other claims set out below.

DETAILED DESCRIPTION OF THE INVENTION

Figure 1:
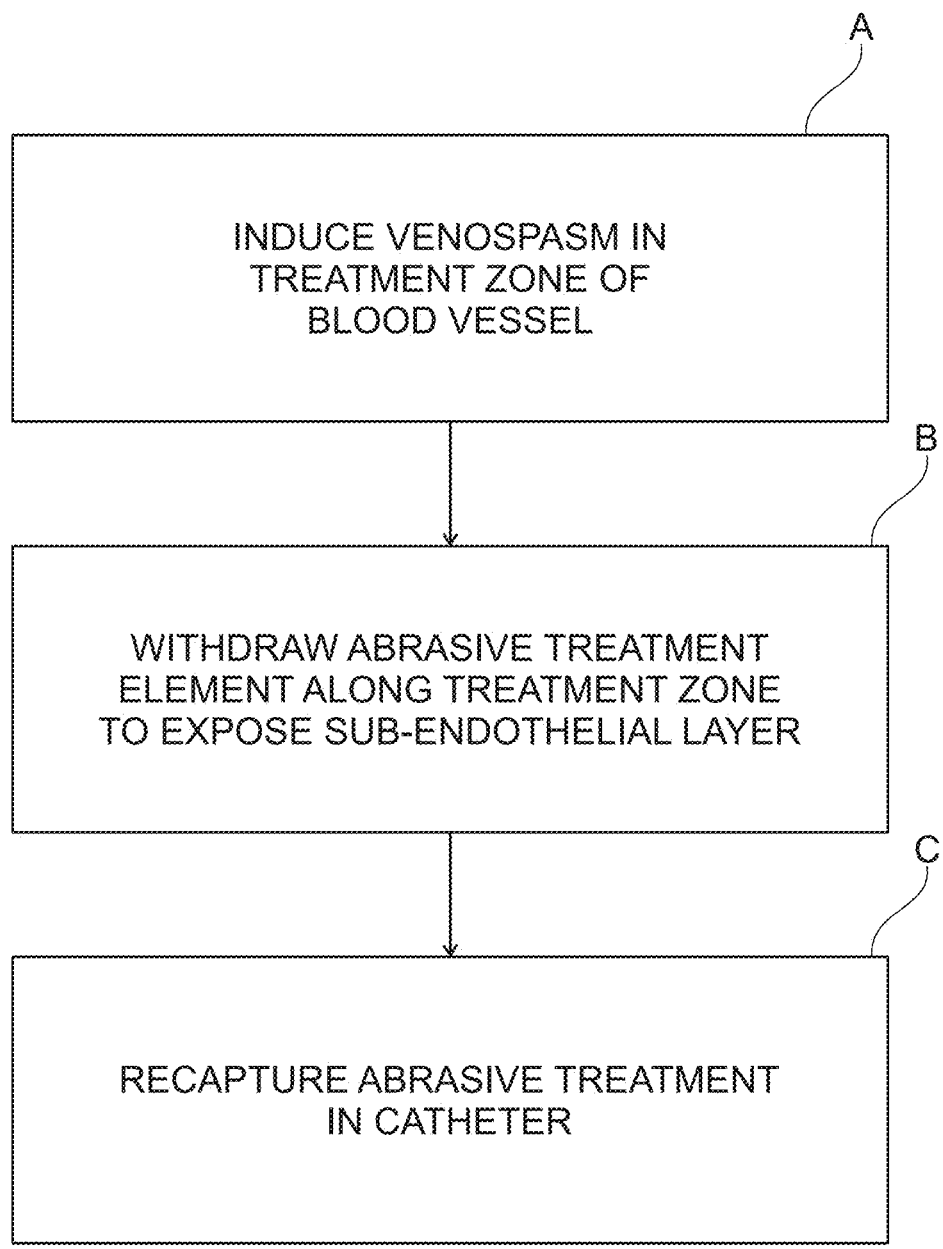
FIG. 1 is a block diagram of a process for treating a blood vessel according to one embodiment of the disclosure.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "disease" is used to define any abnormal condition that impairs physiological function and is associated with specific symptoms. The term is used broadly to encompass any disorder, illness, abnormality, pathology, sickness, condition or syndrome in which physiological function is impaired irrespective of the nature of the aetiology (or indeed whether the aetiological basis for the disease is established). It therefore encompasses conditions arising from infection, trauma, injury, surgery, radiological ablation, poisoning or nutritional deficiencies.

As used herein, the term "treatment" or "treating" refers to an intervention (e.g. the administration of an agent to a subject) which cures, ameliorates or lessens the symptoms of a disease or removes (or lessens the impact of) its cause(s) (for example, the reduction in accumulation of pathological levels of lysosomal enzymes). In this case, the term is used synonymously with the term "therapy".

Additionally, the terms "treatment" or "treating" refers to an intervention (e.g. the administration of an agent to a subject) which prevents or delays the onset or progression of a disease or reduces (or eradicates) its incidence within a treated population. In this case, the term treatment is used synonymously with the term "prophylaxis".

As used herein, an effective amount or a therapeutically effective amount of an agent defines an amount that can be administered to a subject without excessive toxicity, irritation, allergic response, or other problem or complication, commensurate with a reasonable benefit/risk ratio, but one that is sufficient to provide the desired effect, e.g. the treatment or prophylaxis manifested by a permanent or temporary improvement in the subject's condition. The amount will vary from subject to subject, depending on the age and general condition of the individual, mode of administration and other factors. Thus, while it is not possible to specify an exact effective amount, those skilled in the art will be able to determine an appropriate "effective" amount in any individual case using routine experimentation and background general knowledge. A therapeutic result in this context includes eradication or lessening of symptoms, reduced pain or discomfort, prolonged survival, improved mobility and other markers of clinical improvement. A therapeutic result need not be a complete cure.

In the context of treatment and effective amounts as defined above, the term subject (which is to be read to include "individual", "animal", "patient" or "mammal" where context permits) defines any subject, particularly a mammalian subject, for whom treatment is indicated. Mammalian subjects include, but are not limited to, humans, domestic animals, farm animals, zoo animals, sport animals, pet animals such as dogs, cats, guinea pigs, rabbits, rats, mice, horses, cattle, goats, cows; primates such as apes, monkeys, orangutans, and chimpanzees; canids such as dogs and wolves; felids such as cats, lions, and tigers; equids such as horses, donkeys, and zebras; food animals such as cows, pigs, and sheep; ungulates such as deer and giraffes; and rodents such as mice, rats, hamsters and guinea pigs. In preferred embodiments, the subject is a human.

As used herein, the term "body lumen" means a cavity in the body, and may be an elongated cavity such as a vessel (i.e. an artery, vein, lymph vessel, urethra, ureter, sinus, auditory canal, nasal cavity, bronchus, fallopian tube, spermatic duct) or an annular space in the heart such as the left atrial appendage, left ventricular outflow tract, the aortic valve, the mitral valve, mitral valve continuity, tricuspid valve, pulmonary valve, or heart valve, or venous valve, or valve opening. Preferably the body lumen is a vasculature (i.e. a vein or artery or an arterio-venous vessel). The vein may be selected from a saphenous vein (SSV, GSV, AASV), a pelvic vein, varicocele, or a portal vein. The artery may be selected from an aorta, superior rectal artery, a section of artery intended for stenting for full or partial embolisation, a uterine artery, or a ductus arteriosus. The body lumen may be a section of the gastrointestinal tract, for example the duodenum, small intestine. The body lumen may be the oesophagus.

"Transluminal delivery" means delivery of the body lumen denuding body to a target site (for example a varicose vein) through a body lumen, for example delivery through an artery, vein, or the gastrointestinal tract.

Figure 13:
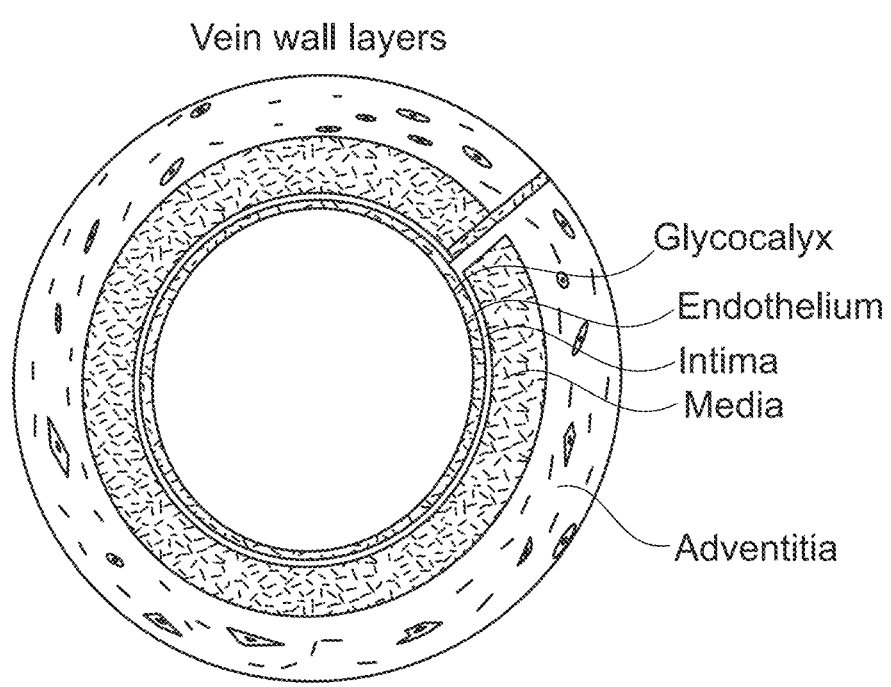
FIG. 13 is an illustration of the human vasculature in an axial plane showing the composition of a typical vein wall including the inner lining of the vein (tunica intima) with associated endothelium and glycocalyx coverings, adjacent intermediate layer (tunica media) and outer layer (tunica adventitia). The typical thickness in micrometres for an adult vein wall is also included.
Figure 14:
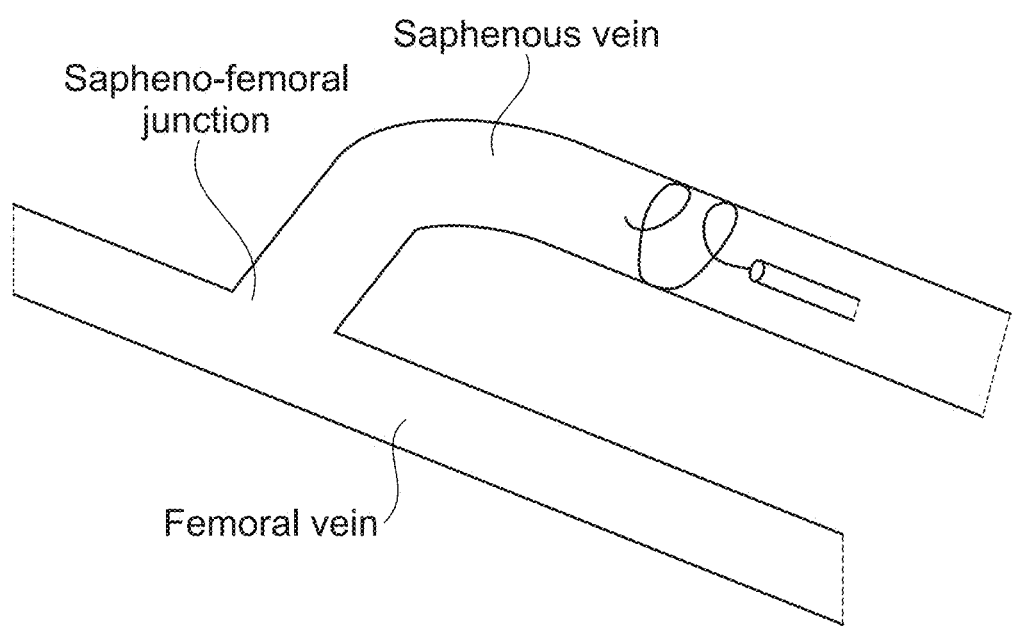
FIG. 14 illustrates the sapheno-femoral junction.
Figure 15:
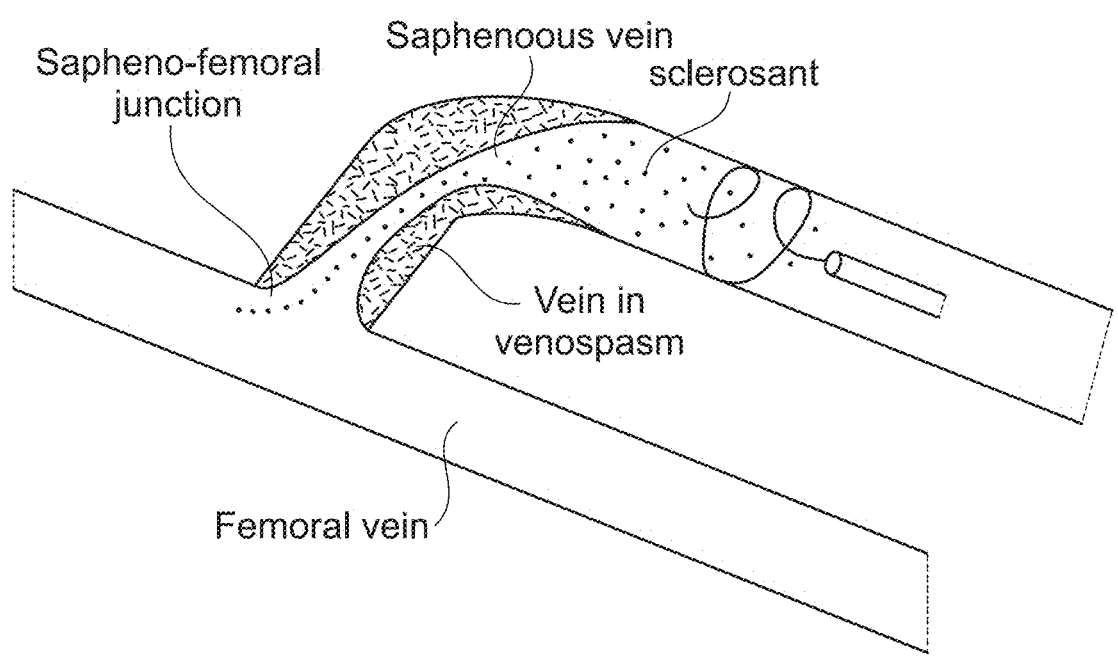
FIG. 15 illustrates a method of treating a vein according to one embodiment of the disclosure. In this method, a device of the disclosure is advanced into the saphenous vein, deployed just proximal of the sapheno-femoral junction, and retracted causing the saphenous vein to spasm (and narrow) as illustrated. This limits the passage of fluid from the saphenous vein into the femoral vein. The device is then used to treat a section of the saphenous vein proximal of the part of the vein is spasm, including delivery of sclerosant. The sclerosant persists in the treated section due to the narrowed part of the vein causing reduced fluid flow.
Figure 16:
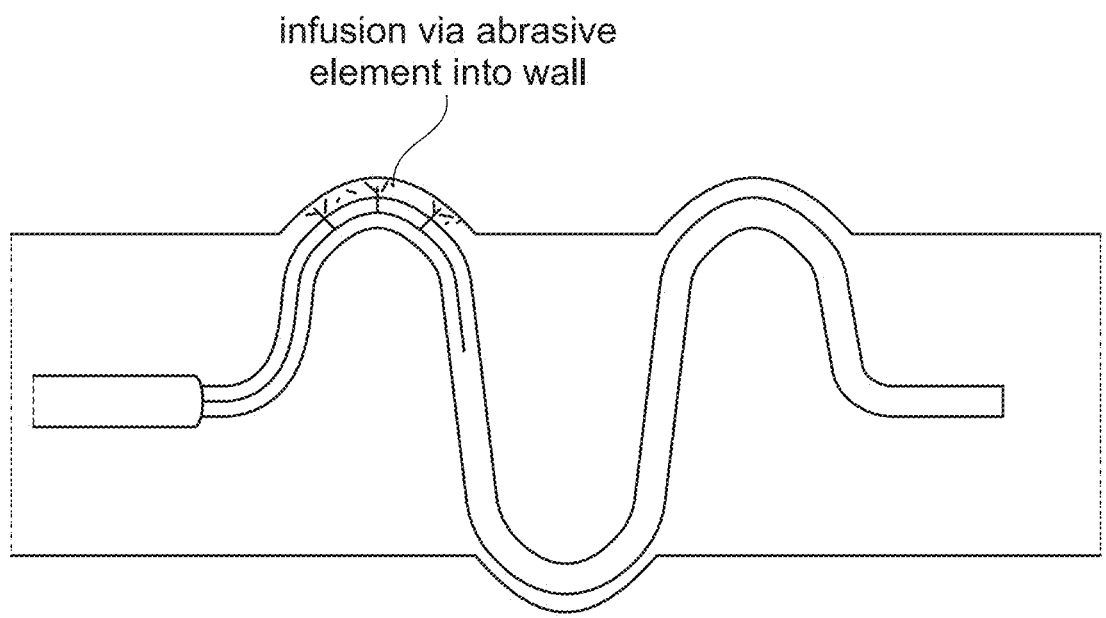
FIG. 16 is an illustration of sclerosant being infused into a vessel wall via abrasive elements on the helical coil.
Figure 17A:
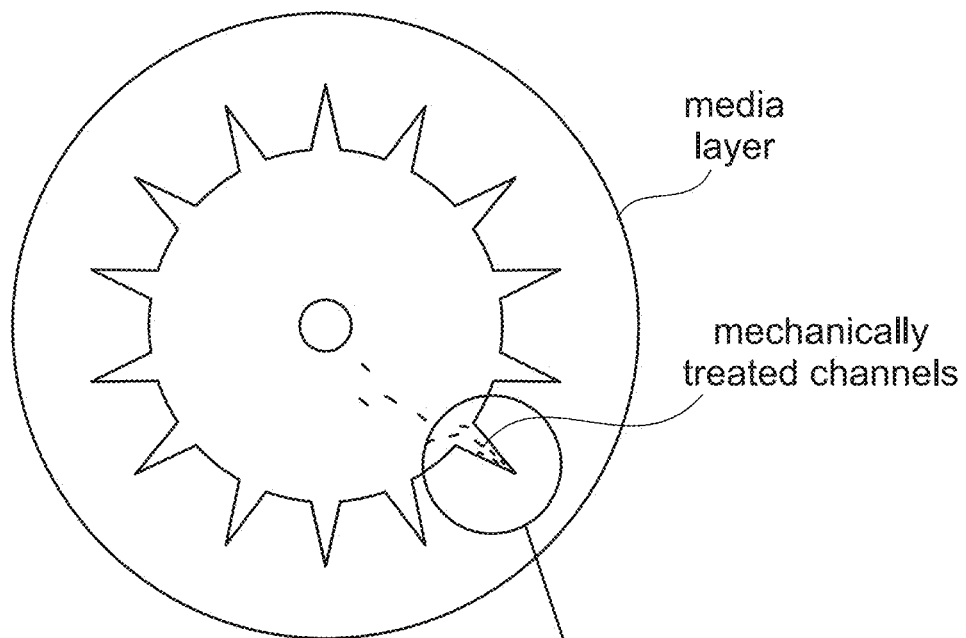
FIG. 17A is an illustration of a treated vein (in sectional view) showing channels that are mechanically created in the vein lumen that extend into the media layer.
Figure 17B:
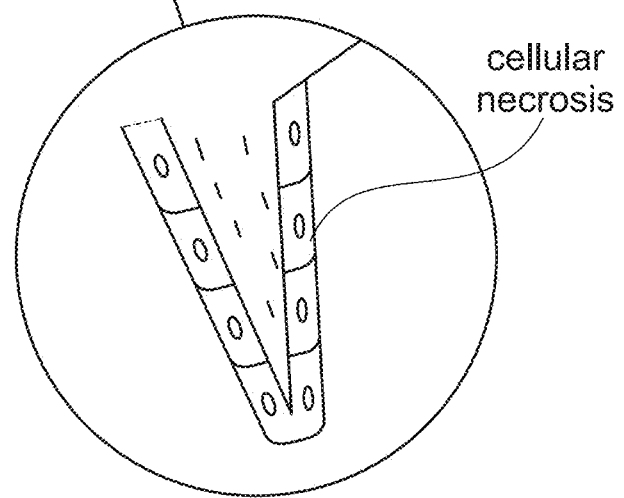
FIG. 17B is a detailed view of one channel showing how sclerosant accesses the channel causing cellular necrosis in the media layer cells lining the channel.

As used herein, the term "coil" should be understood to mean a loop-shaped element that is adjustable from an uncoiled configuration suitable for retraction into a catheter member and coiled configuration that in use is capable of circumferentially engaging and impressing its surface against a body lumen (i.e. engage the internal lumen of the vein along at least one full turn of the coil). The coil in its coiled configuration is generally circular, but may also be oval, square, triangular, or rectangular, as long as it is capable of circumferentially engaging an inner wall of the body lumen. As most veins and arteries have a circular, or almost circular, profile, a circular coil is preferred, as the radial force exerted by the coil in its deployed configuration is spread evenly around the wall of the body lumen. A coil having a diameter equal or greater than the diameter of the body lumen to be treated along at least one full turn of the coil is required to achieve circumferential engagement with the internal lumen of a vein, and thereby achieve circumferential denuding of the vein (see A in FIG. 13). In a preferred embodiment, the coil is a helical coil having at least one full circumferential turn, and preferably from 1 to 3 turns, for example about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or 2.9 turns. The coils of the helical coil are preferably circular, but may also have another profile, for example oval, square, triangular, or rectangular. The helical coil may be conical. The diameter of the coil is typically 2-20 mm, more preferably 3-12 mm, in a relaxed state. The pitch of the helical coil is typically approximately the same as the diameter, but it may vary from 0.5 to 1.5 times the diameter, in a relaxed state. It will be appreciated that the dimensions of the coil may be varied depending on the body lumen, to ensure that the coil is "oversized" with respect to the diameter of the body lumen. In this regard, the diameter of the coil (or the maximum diameter in the case of helical coils whose diameter varies along its length) is generally at least about 5% greater than the diameter of the body lumen to be treated, for example at least 10%, 15%, 20%, 25% or 30% the diameter of the body lumen to be treated, and typically from 5-30% greater. It is important that the coil is oversized along at least one turn of the coil, and typically oversized along 1-2 turns. The coil may be formed from an elongated element, typically a single elongated element, for example a wire or filament. The coil may be formed from a metal (for example stainless steel) or metal alloy, or it may be formed from a shape-memory alloy such as NITINOL, or it may be formed from a natural, synthetic or semi-synthetic polymer such as chitosan, nylon or rayon. The body lumen denuding head ideally consists of a single coil element, although in certain embodiments the coil may comprise a plurality of coil elements, for example 2, 3, 4, 5, 6, 7, 8, 9 or 10, and preferably 2-4 coil elements.

The width of the coil element is at least 0.1 mm. The width is typically 1 to 3 mm to allow delivery via an appropriately sized catheter and introducer sheath.

Typically, the helical coil is sufficiently resiliently deformable to maintain a circumferential radial force against the wall of the body lumen of varying diameter as it travels along the body lumen (i.e. it is configured to "self-adjust" or is "self-adjustable"). This is illustrated in FIG. 59 which illustrates the use of a device of the invention to denude a vein with several bends and a diameter that progressively increases. In this embodiment, the helical coil in its deployed state will be oversized with respect to the widest part of the body lumen, thereby exerting a radial force around the full circumference of the body lumen at its widest point shown in FIG. 59C, and is sufficiently resiliently deformable for the coil diameter to adjust to varying diameter of the vein while maintaining a denuding radial force against the circumference of the body lumen. The helical coil is typically sufficiently resiliently deformable to allow the coil pass through constrictions or valves in veins, as illustrated in FIGS. 56 and 57, respectively. These constrictions or changes in vein diameter over the treatment length may be either static (wider diameter of proximal vessel tapering to narrower distal vessel) or dynamic (contraction of vein wall smooth muscle leading to reduced vein diameter in a physiological process known as venospasm). The reducing vein diameter will increase the radial forces on the helical coil, this will in turn increase the hoop force generated within the material of the helical coil which will translate as a longitudinal force to increase the length of the coil. This concept is illustrated in FIG. 60 where the device is shown deployed in a typical vessel over a length I and diameter D. The radial force is equivalent to the pressure P acting perpendicular to the vein wall. The pressure that the vessel exerts on the oversized coil or hoop force (HF) is acting to compress the coil and increases when the diameter of the vessel is reduced to d. Due to the open helical coil design this increased hoop force will translate longitudinally to lengthen the coil to a length L. This will allow a reduction of the radial forces at the contact point of the device outer surface with the vein wall to prevent excessive friction but maintain sufficient force to keep the surface engaged and impressed against the vein. Excessive friction can lead to undesirable catching or snagging of coil segments and wall perforation and/or trauma to connective tissue adjacent to the vein.

As used herein, the term "treatment zone" as applied to a body lumen, vessel or superficial vein refers to a cylindrical section of a body lumen that is involved in the pathogenesis of a disease state and is typically 1 cm or greater in length. In the context of a superficial vein, the term "treatment zone" should be understood to mean a cylindrical section of the lumen of the superficial vein that fails to circulate blood effectively, and is typically 1 cm or greater in length. In one embodiment, the treatment zone is 1-50 cm, 1-40 cm, 1-30 cm, 1-25 cm, 1-15 cm, 1-10 cm, 5-50 cm, 5-40 cm, 5-30 cm, 5-25 cm, 5-15 cm, 5-10 cm, 10-50 cm, 10-40 cm, 10-30 cm, 10-25 cm, or 10-15 cm, in length.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

FIG. 1 is a block diagram illustrating one embodiment of a method of the disclosure. In this case, the blood vessel is a vein. The method comprises (A) inducing venospasm in a treatment zone of the vein, (B) withdrawing an abrasive element along the treatment zone of the vein while the vein is in venospasm to expose sub-endothelial layers of the vein wall along the treatment zone and (C) recapturing the abrasive element into a delivery catheter. The Applicant has discovered that inducing venospasm in the vein prior to withdrawing the abrasive element along the wall of the vein improves the process of exposure of the sub-endothelial layers of the vein wall, providing for improved thrombus formation and resultant occlusion of the vein. The method may employ a device comprising a delivery catheter configured for percutaneous delivery to the treatment zone of the vein and an abrasive treatment element disposed in a lumen of the delivery catheter configured for deployment out of a distal end of the delivery catheter. The abrasive treatment element may be a helical coil that is radially expansible from a contracted delivery configuration to a radially expanded deployed configuration. Other abrasive treatment elements may be employed, for example a rotating wire or brush. Step (A) may involve mechanical stimulation of vein, for example by withdrawing the abrasive treatment element along the vein prior to venospasm where the coil will brush against the wall of vein inducing venospasm. This may be achieved by sizing the helical coil such that upon deployment it has a diameter that approximates to a diameter of the vein at the treatment zone, whereby withdrawal induces venospasm without exposing the sub-endothelial layers of the vein. Once in vasospasm, a secondary withdrawal of the abrasive treatment element along the narrowed vein will cause the necessary sub-endothelial disruption to generate a thrombus an resultant occlusion of the vein.

Figure 2:
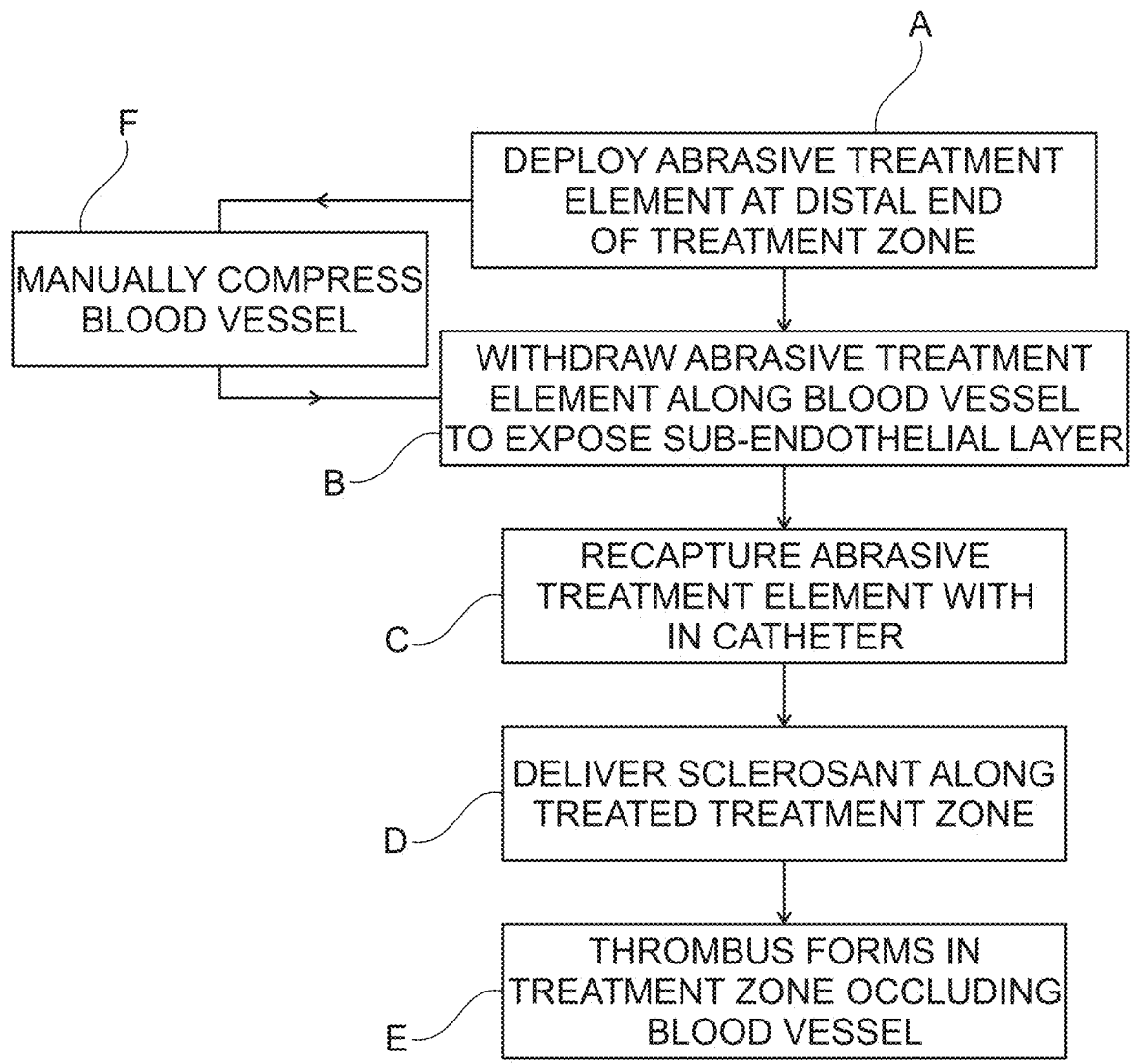
FIG. 2 is a block diagram of a process for treating a blood vessel according to a second embodiment of the disclosure.
Figure 3:
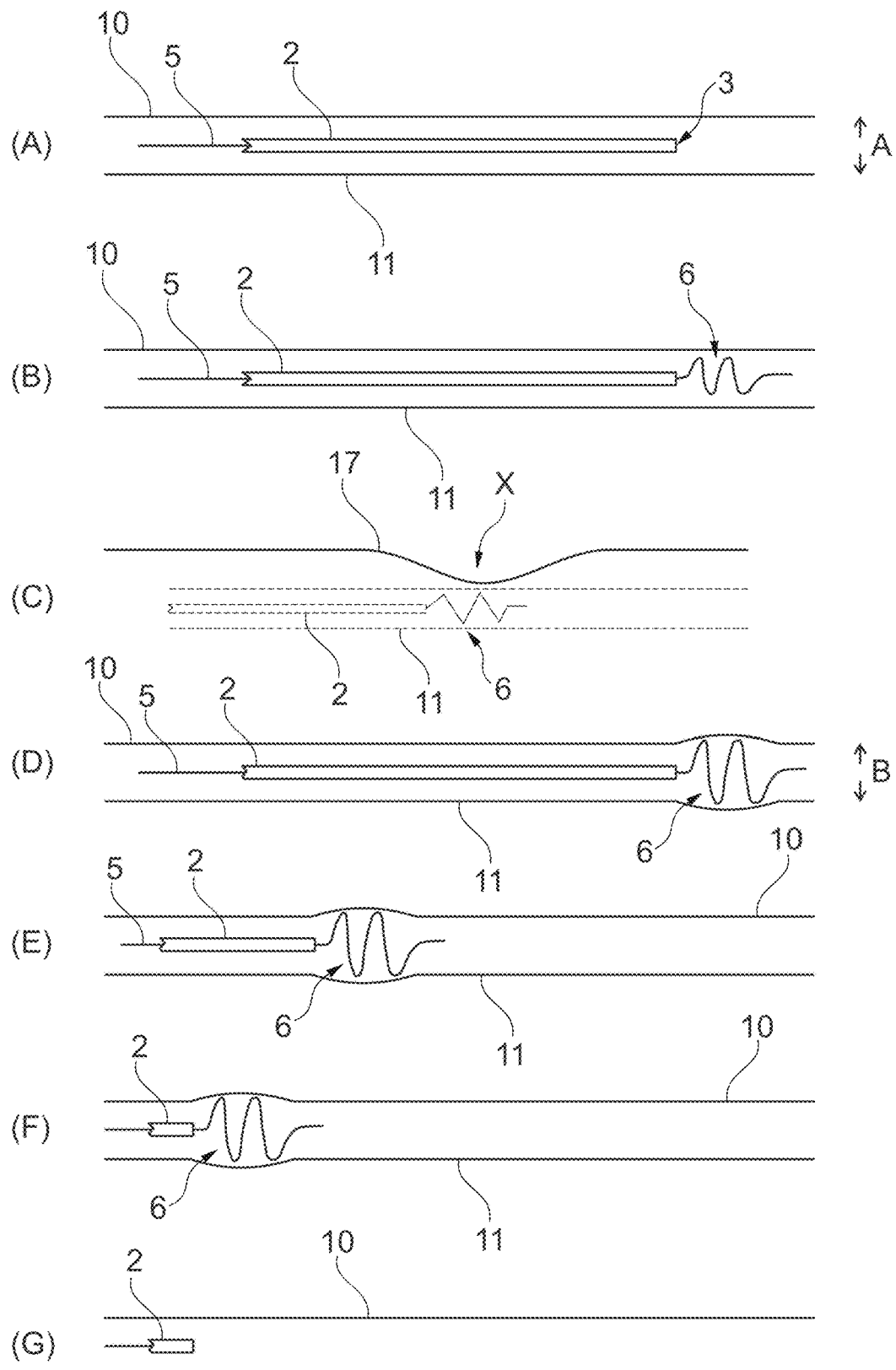
FIGS. 3A to 3G illustrate a method of treating a blood vessel according to a further embodiment of the disclosure.
Figure 4:
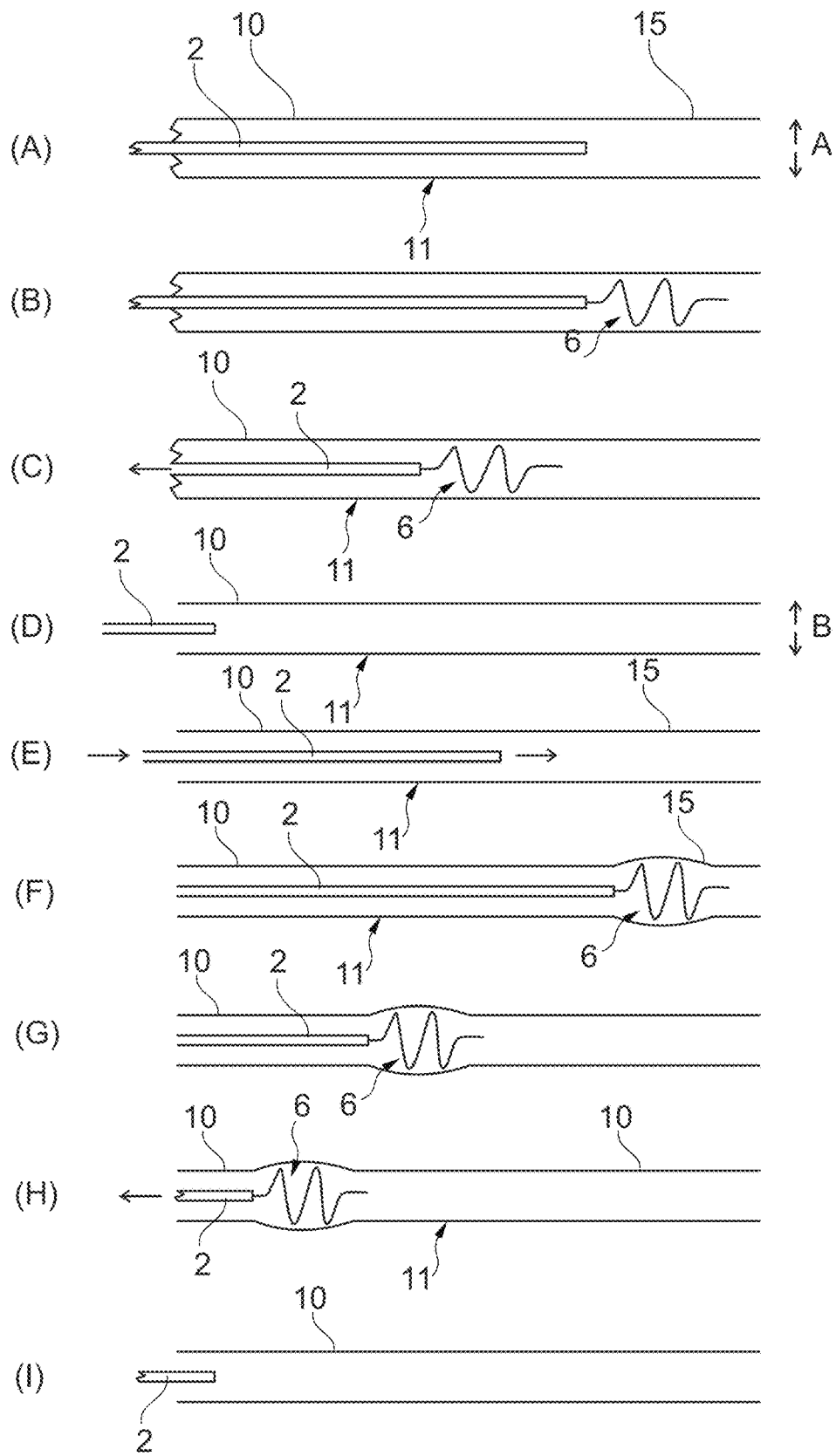
FIGS. 4A to 4I illustrate a method of treating a blood vessel according to a further embodiment of the disclosure.
Figure 5:
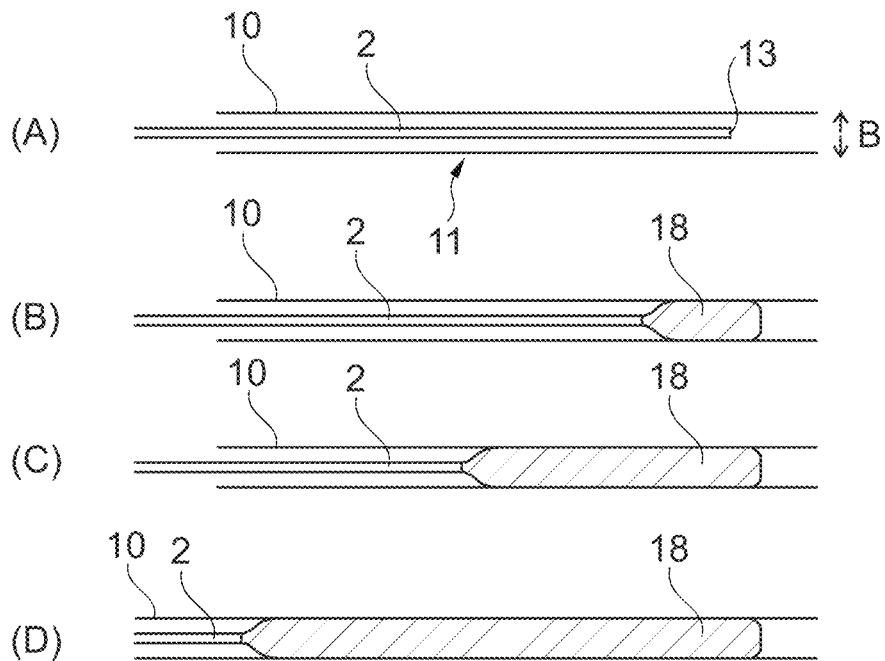
FIGS. 5A to 5D illustrate a method of treating a blood vessel according to a further embodiment of the disclosure.

FIG. 2 is a block diagram illustrating another embodiment of a method of the disclosure. In this case, the blood vessel is a vein. The method comprises (A) deploy an abrasive treatment element at a distal end of a treatment zone of the vein, (B) withdrawing the abrasive element along the treatment zone of the vein in a distal to proximal direction (thus against the normal direction of blood circulation in the vein) to expose sub-endothelial layers of the vein wall along the treatment zone, (C) recapturing the abrasive element into a delivery catheter, and (D) delivering sclerosant foam along the mechanically disrupted area of the treatment zone, whereby the sclerosant foam is brought into contact with the exposed sub-endothelial layers of the vein wall and (E) forms a thrombus that occludes the vein. The Applicant has discovered that exposing sub-endothelial layers of the vessel wall at the treatment zone, prior to delivering sclerosant into the treatment zone, improves the process of thrombus formation and resultant fibrotic inflammatory processes which lead to significant wall thickening and narrowing or occlusion of the vein. The method may employ a device as described above with reference to FIG. 1, and the delivery catheter may include a lumen for delivery of sclerosant. An optional additional step (F) comprises manual compression of the treatment zone of the vein when the deployed helical coil is being withdrawn.

In the methods described herein, withdrawal of the abrasive treatment element generally comprises withdrawal of the delivery catheter.

FIG. 3A to 3G illustrates in more detail a method of one embodiment of the disclosure. The method employs a treatment device 1 comprising a delivery catheter 2 dimensioned for transluminal delivery to a target vein 10, the device 1 having a lumen 3 and an abrasive treatment element disposed within the lumen. The abrasive treatment element comprises a control arm 5 and an helical coil 6 mounted on a distal end 7 of the control arm 5 that is deployable from a contracted delivery configuration (where it is stowed within the lumen 3) and a radially expanded deployed configuration shown in FIG. 3B. An external surface of the helical coil has a roughened surface (not shown) configured to disrupt sub-endothelial layers of the vein wall when it is impressed against the vein wall and withdrawn. Examples of such devices are described in WO2019/219975. The control arm extends along the length of the lumen and exists a proximal end of the delivery catheter allowing manual axial adjustment of the control arm to deploy and recapture the helical within the distal end of the catheter.

FIG. 3A shows a vein 10 having a treatment zone 11 of 10 cm in length. A distal part 12 of the treatment device 1 is shown transluminally advanced into the vein such that the distal end 13 of the delivery catheter 2 is located at a distal end 15 of the treatment zone 11. The positioning of the device can be confirmed with imaging. Once the device is confirmed to be in this position, the delivery arm is advanced to deploy the abrasive treatment element.

FIG. 3B shows the deployment of an abrasive treatment element 4 by advancing the control arm 5 distally to advance the helical coil 6 out of the distal end 13 of the delivery catheter 2 whereby it self-expands into a helical shape. In this embodiment, the helical coil 6 is dimensioned to have a diameter that is slightly less than a nominal diameter of the vein, indicated as B in FIG. 3B.

FIG. 3C illustrates manual compression of the skin 17 to compress the treatment zone 11 of the vein 10 and bring the vein wall either partially or fully into contact with the deployed helical coil 6. This is achieved by manual compression on the skin 17 from the user's hand, through use of a latex compression wrap or with the surface of the ultrasound probe and applying pressure in the direction of the arrow marked X. The purpose of this is to compress the vein 10 to bring the wall of the vein into contact with the abrasive treatment element, mechanically stimulating the vein to induce (or increase the level of) venospasm in the vein. The point of pressure may be moved as the coil is withdrawn along the treatment zone of the vein.

FIG. 3D illustrates the treatment zone 11 of the vein 10 after venospasm has been induced. The treatment zone 11 now has a reduced diameter B which results in the wall of the lumen of the vein being brought into full circumferential contact with the deployed coil 6 with sufficient radial force to cause the roughened surface of the helical coil to engage and push out against the wall of the lumen of the vein. When the catheter is withdrawn through this spasmed length of vein it causes disruption of the sub-endothelial layers of the vein wall through a mechanical ablation effect of the abrasive lumen engaging surface contacting the wall with adequate pressure or outward radial force.

FIG. 3E illustrates the device 1 being withdrawn proximally along the treatment zone 11 of the vein 10, causing disruption to sub-endothelial layers of the vein wall as it passes along the treatment zone.

FIG. 3F illustrates the helical coil 6 disposed at the proximal end of the treatment zone, whereupon the helical coil 6 is re-captured into the distal end 13 of the delivery catheter 2 (FIG. 3G).

FIG. 4A to 4I illustrates in more detail a method of another embodiment of the disclosure. In this embodiment, no manual compression of the vein 10 occurs to induce venospasm, instead the delivery catheter 2 is advanced into the treatment zone 11 (4A) which at this stage has a diameter A, the helical coil 6 is deployed at the distal end 15 of the treatment zone 11 (4B), the device 1 is then withdrawn proximally with the helical coil deployed (4C). As the treatment zone of the vein is not straight and has a non-uniform diameter, this will result in the deployed coil brushing against the wall of the vein as it is withdrawn along the length of the vein which induces venospasm causing the diameter to reduce to B (4D). The helical coil 6 is then recaptured before the delivery catheter 2 is advanced distally (4E) to the distal end 15 of the treatment zone 11 and the helical coil is re-deployed (4F) and withdrawn (4G, 4H) causing disruption to sub-endothelial layers of the vein wall as it passes along the treatment zone. Finally, the helical coil 6 is recaptured in the distal end 13 of the delivery catheter 2 (4I).

FIG. 5A to 5D illustrate one embodiment of a method of the disclosure comprising infusing a sclerosant agent into treatment zone 11 of the vein via the delivery catheter to contact and induce cellular necrosis in the exposed subendothelial layers of the vessel wall. This is carried out after the wall of the lumen of the vein has been disrupted according to the method described above with reference to FIGS. 3 and 4. In this embodiment, the delivery catheter 2 has a fluidic lumen (not shown) to deliver sclerosant agent out of a distal end 13 of the delivery catheter 2. Initially, the delivery catheter 2 is advanced distally along the treatment zone 11 until the distal end 13 of the delivery catheter 2 is located at the distal end 15 of the treatment zone 11 (5A). Sclerosant agent 18 is then delivered out of the distal end 13 of the catheter 2 while the catheter 2 is withdrawn proximally (5B and 5C), thus trailing a plug of sclerosant agent along the treatment zone (5D). The sclerosant agent is brought into direct contact with the sub-endothelial layers of the vein-treated vein, inducing cellular necrosis in the exposed subendothelial layers of the vessel wall.

FIG. 6A to 6D illustrate another embodiment of a method of the disclosure comprising infusing a sclerosant agent into treatment zone 11 of the vein 10, in which parts described with reference to the previous embodiments are assigned the same reference numerals. In this embodiment, which is substantially the same as that described with reference to FIG. 5, the delivery catheter 2 has a second fluidic conduit (not shown) to deliver a fluid such as saline 19 from distal end 13 of the delivery catheter 2 in a proximal direction. Thus, as the delivery catheter 2 is withdrawn proximally along the treatment zone 11 it will deliver sclerosant agent 18 distally and saline 19 proximally in advance of the sclerosant agent 18. The purpose of the saline 19 is to displace blood from the vein lumen in advance of the sclerosant being delivered, thus allowing the sclerosant access to the sub-endothelial layers of the treated vein before deactivation of sclerosant can occur due to contact with intraluminal blood. The sclerosant is subsequently consumed or deactivated though its intended interaction with the cells of the vein wall in the treatment zone.

Figure 6:
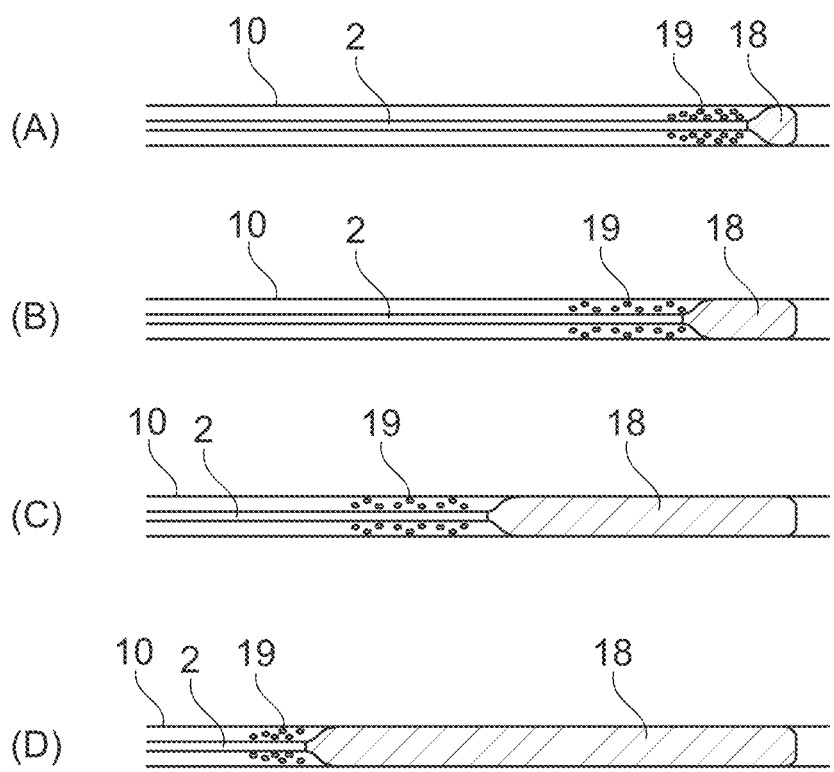
FIGS. 6A to 6D illustrate a method of treating a blood vessel according to a further embodiment of the disclosure.
Figure 7:
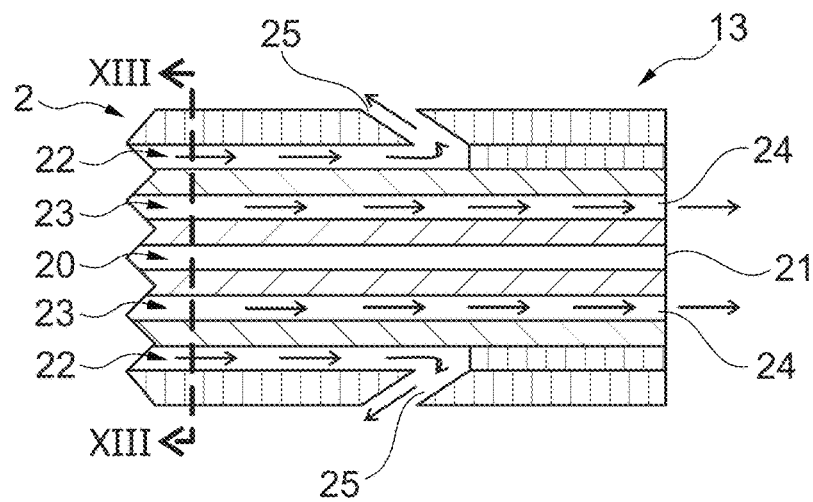
FIG. 7 is a section side elevational view of a distal end of a delivery catheter according to one embodiment of the disclosure.
Figure 8:
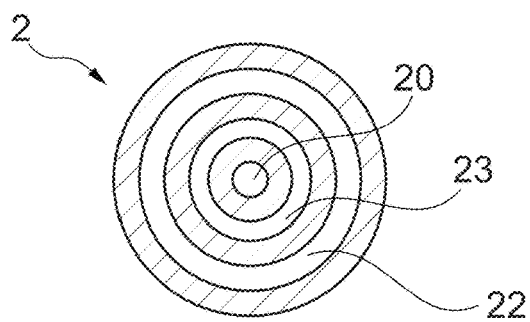
FIG. 8 is sectional view taken along the lines VIII-VIII of FIG. 7.

FIG. 7 is a sectional side elevational view of a distal end of the delivery catheter 2 shown in FIG. 6. The catheter is a multi-lumen catheter having a central lumen 20 in which the control arm 5 and helical coil 6 is stowed and having a distal outlet 21 at the distal end 13 of the delivery catheter 2, an outer lumen 22 for delivery of saline 19, and a middle lumen 23 for delivery of sclerosant having an outlet 24 at the distal end 13 of the delivery catheter 2. The outer lumen 22 terminates before the distal end 13 of the catheter 2 and comprises an outlet nozzle 25 on each side of the catheter configured to direct a jet of saline rearwardly against the vessel wall. FIG. 8 is a sectional view taken along the lines VIII-VIII of FIG. 7 showing the inner, outer, and middle lumens of the catheter 2.

Figure 9:
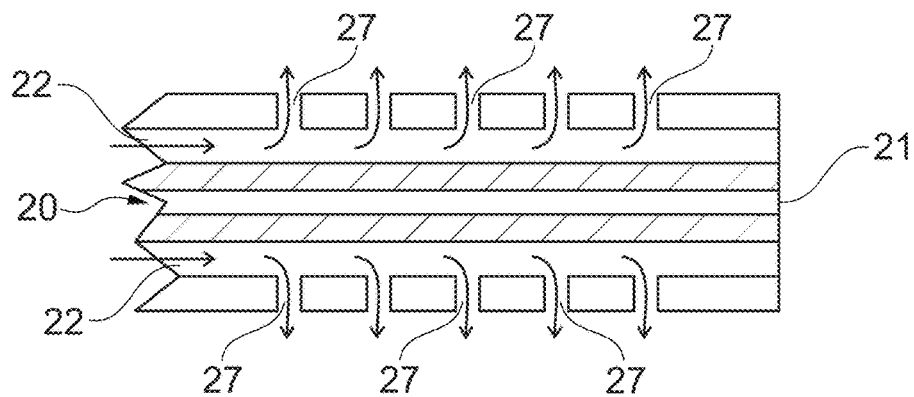
FIG. 9 is a section side elevational view of a distal end of a delivery catheter according to a further embodiment of the disclosure.

FIG. 9 is a sectional side elevational view of a distal end of another delivery catheter. In this embodiment, the delivery catheter is a multi-lumen catheter having a central lumen 20 in which the control arm (not shown) and helical coil (not shown) is stowed and an outer lumen 22 for delivery of sclerosant agent. The outer lumen 22 has five outlets 27 spaced-apart along the distal end of the catheter, on opposite sides of the catheter. In use, sclerosant agent 18 is delivered through the other lumen 22 to the distal end of the catheter 2 where it exits through the ten outlets directed at the wall of the lumen.

Figure 10:
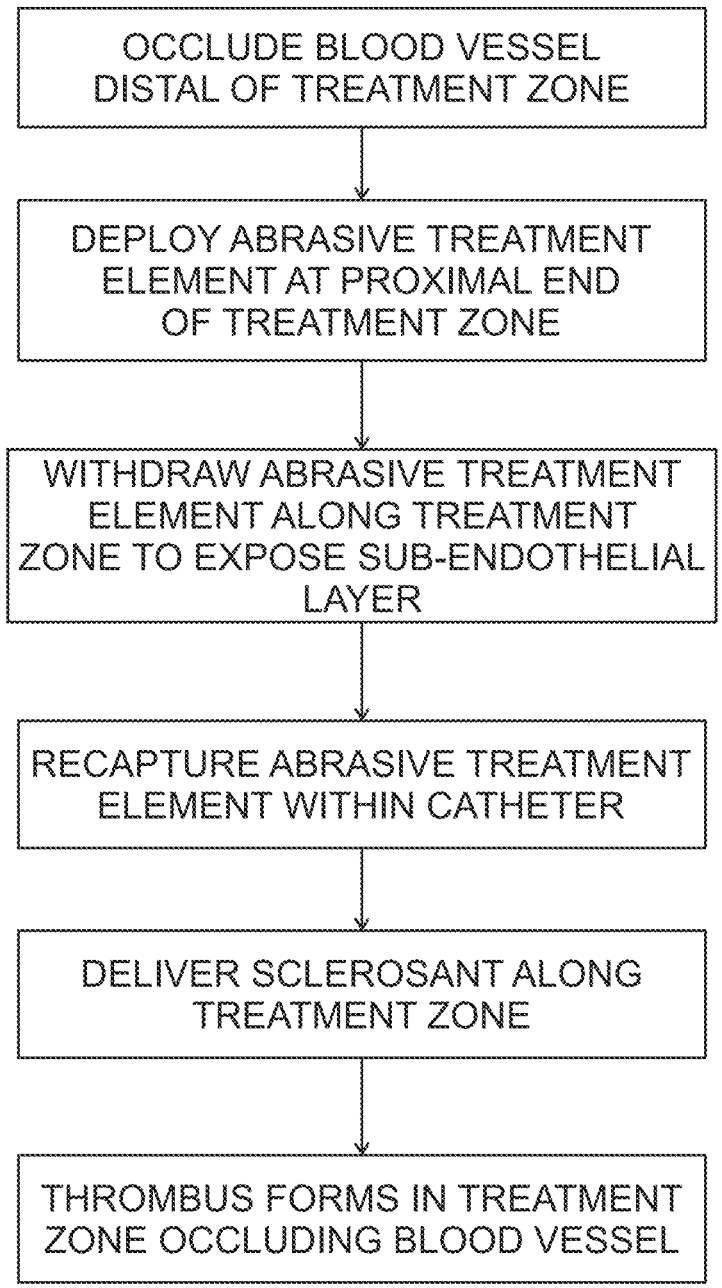
FIG. 10 is a block diagram of a process for treating a blood vessel according to a further embodiment of the disclosure.

FIG. 10 is a block diagram illustrating another embodiment of a method of the disclosure. In this case, the blood vessel is a vein. The method comprises (A) occluding a blood vessel at a point distal of a treatment zone of the vein (distal occlusion zone), (B) deploying an abrasive treatment element at a distal end of a treatment zone of the vein, (C) withdrawing the abrasive element along the treatment zone of the vein in a distal to proximal direction (thus against the direction of flow of blood in the vein) to expose sub-endothelial layers of the vein wall along the treatment zone, (D) recapturing the abrasive element into a delivery catheter, (E) delivering sclerosant foam along the treated treatment zone, whereby the sclerosant foam is brought into contact with the exposed sub-endothelial layers of the vein wall and (E) allowing a thrombus to form that occludes the vein. The Applicant has discovered that occluding or significantly narrowing the vein distal to the treatment zone, for example the Great Saphenous Vein (GSV) of the lower limb or a junctional point with the deep venous circulation, including the saphenofemoral junction and junctions of perforator veins, allows for higher efficacy of the sclerosant due to longer contact time with the vessel wall and slower drainage into deep venous circulation. This results in a better chemical ablation and long term occlusion of the treatment zone to be achieved. The distal occlusion may be performed by carrying out steps (B) to (E) at the distal occlusion zone.

Figure 11:
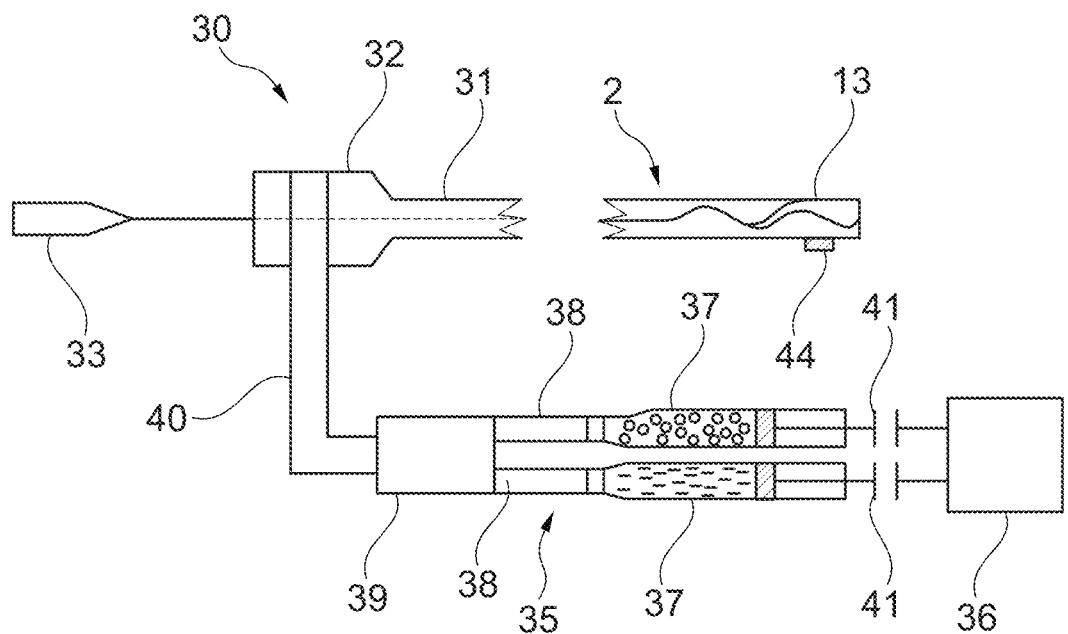
FIG. 11 is an illustration of a system according to one embodiment of the disclosure comprising a delivery catheter (with an optional sensor on the distal end thereof), axially movable abrasive element, catheter hub, injector including mixing chamber, and actuator for the injector.

FIG. 11 illustrates a device according to one embodiment of the disclosure in more detail. In this embodiment, the device 30 comprises a delivery catheter 2 as described previously having a distal end 13 and a proximal end 31 fluidically connected to a catheter hub 32. The control arm 5 extends through the hub and terminates in a grip 33 which can be manually actuated by a user to deploy/re-capture the helical coil 6. The device 30 also includes an injector 35 and an actuator 36 for the injector. The injector 35 comprises two syringes 37 having outlet nozzles 38 fluidically connected to a mixing chamber 39 which is in turn fluidically connected to the delivery catheter hub 32 via a conduit 40. Syringe plungers 41 are actuated by actuation arms 42 of the actuator 36. In use, one of the syringes contains a gas and one contains a detergent liquid. The actuator 36 actuates the syringes to pump gas and detergent into the mixing chamber 39 where it forms a foam which is delivered through the conduit 40 and catheter hub 32 to a sclerosant agent delivery lumen in the catheter 2. Use of an actuator allows the sclerosant to be delivered in a controlled and consistent manner without the user having to operate the syringes. The distal end 13 of the delivery catheter 2 may include a sensor 44 to detect a parameter of the wall of the body lumen, for example a diameter, or a speed of movement of the catheter relative to the vessel. This enables the user to determine the volume of the treatment zone of the blood vessel and calculate the correct amount of sclerosant to the delivered to the treatment zone. Sensing the speed of movement of the catheter during sclerosant delivery allows the syringe actuator to be controlled to deliver the sclerosant at the correct delivery rate so that it is delivered homogenously along the length of the treatment zone (assuming that the length of the treatment zone is known). A processor may be employed to control the syringe actuator, and the sensor may be operatively coupled to the processor to relay data to the processor.

Figure 12:
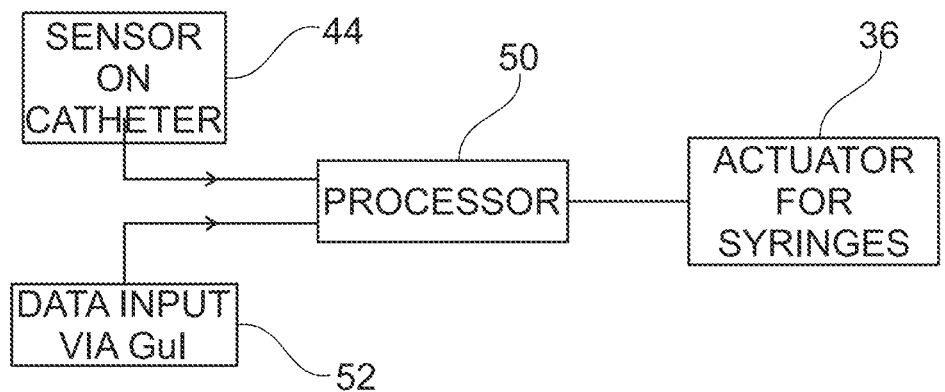
FIG. 12 is a block diagram illustrating a system according to another embodiment of the disclosure comprising a processor configured to receive data from (a) a sensor disposed on a distal end of the delivery catheter and (b) a user operable graphical user interface (GUI), and provide an output to the actuator of the injector.

FIG. 12 is a block diagram illustrating one embodiment of the device of the disclosure having a processor 50, a sensor 44 (ideally disposed on a distal end of the delivery catheter) configured to provide input data to the processor, a graphical user interface 52 configured to provide input data to the processor, and the syringe actuator 36 configured to receive output signals form the processor.

REFERENCES

Treatment device 1, 30
Delivery catheter 2
Lumen 3
Control arm 5
Helical coil 6
Distal end 7 of the control arm 5
Vein 10
Treatment zone 11
Distal part 12 of the treatment device 1
Distal end 13 of the delivery catheter 2
Distal end 15 of the treatment zone 11
Skin 17
Sclerosant agent 18
Saline 19
Central lumen 20
Distal outlet 21
outer lumen 22
middle lumen 23
outlet 24
outlet nozzle 25
outlets 27
Proximal end 31 of delivery catheter
Catheter hub 32
Grip 33
Injector 35
Actuator 36
Syringes 37
Outlet nozzles 38
Mixing chamber 39
Conduit 40
Syringe plungers 41
Actuation arms 42
Sensor 44
Processor 50
Graphical user interface 52

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

REFERENCES

ADDIN ZOTERO_BIBL {"uncited": [ ], "omitted": [ ], "custom": [ ]} CSL_BIBLIOGRAPHY 1. Kabnick L S, Sadek M, Bjarnason H, Coleman D M, Dillavou E D, Hingorani A P, et al. Classification and treatment of endothermal heat-induced thrombosis: Recommendations from the American Venous Forum and the Society for Vascular Surgery. J Vasc Surg Venous Lymphat Disord. 2021 January; 9 (1): 6-22.
2. Connor D E, Cooley-Andrade O, Goh W X, Ma DDF, Parsi K. Detergent sclerosants are deactivated and consumed by circulating blood cells. Eur J Vasc Endovasc Surg. 2015 April; 49 (4): 426-31.
3. Parsi K. Paradoxical embolism, stroke and sclerotherapy. Phlebology. 2012 June; 27 (4): 147-67.
4. Hill D, Hamilton R, Fung T. Assessment of techniques to reduce sclerosant foam migration during ultrasound-guided sclerotherapy of the great saphenous vein. J Vasc Surg. 2008 October; 48 (4): 934-9.
5. Lane T R A, Moore H M, Franklin I J, Davies A H. Retrograde inversion stripping as a complication of the ClariVein mechanochemical venous ablation procedure. Ann R Coll Surg Engl. 2015 March; 97 (2): e18-20.
6. Morrison N. Regarding "Balloon control of the saphenofemoral junction during foam sclerotherapy: proposed innovation." J Vasc Surg. 2008 March; 47 (3): 693.
7. Heger M, van Golen R F, Broekgaarden M, van den Bos R R, Neumann H A M, van Gulik T M, et al. Endovascular laser-tissue interactions and biological responses in relation to endovenous laser therapy. Lasers Med Sci. 2014 Mar. 1; 29 (2): 405-22.

The invention claimed is:

1. A method of treating a lower limb superficial vein in a subject, comprising the steps of:
advancing a catheter device comprising a deployable abrasive element distally across a treatment zone in the lower limb superficial vein;
deploying the abrasive element into contact with a wall of the lower limb superficial vein;
actuating the abrasive element to cause disruption of the wall of the lower limb superficial vein and exposure of subendothelial layers of the wall at the treatment zone;
infusing a sclerosant agent into the lower limb superficial vein via the catheter prior to or immediately after disruption of the wall of the lower limb superficial vein to contact and induce cellular necrosis in the exposed subendothelial layers of the wall of the lower limb superficial vein;
recapturing the abrasive element by the catheter device; and
withdrawing the catheter device from the wall.

2. The method of claim 1, comprising an additional step of inducing vasospasm of the treatment zone of the lower limb superficial vein prior to disruption of the wall by administering a stimulus to the wall by the catheter device.

3. The method of claim 1, comprising an additional step of inducing vasospasm of the treatment zone of the lower limb superficial vein prior to disruption of the wall by administering a stimulus to the wall by the catheter device, in which the stimulus comprises mechanical stimulation of the wall by the abrasive element.

4. The method of claim 1, comprising an additional step of inducing vasospasm of the treatment zone of the lower limb superficial vein prior to disruption of the wall by administering a stimulus to the wall by the catheter device, in which the stimulus comprises mechanical stimulation of the wall by the abrasive element, in which the mechanical stimulation of the wall comprises manual compression on the skin to further engage the mechanical element with the wall.

5. The method of claim 1, comprising an additional step of inducing vasospasm of the treatment zone of the lower limb superficial vein prior to disruption of the wall by administering a stimulus to the wall by the catheter device, in which the stimulus comprises delivery of a chemical, thermal or electrical stimulant to the wall by the catheter device.

6. The method of claim 1, including a step of infusing a sclerosant agent into the lower limb superficial vein via the catheter device prior to, or during, disruption of the wall.

7. The method of claim 1, in which the step of infusing the sclerosant is performed within 1 to 10 minutes after actuation of the abrasive element.

8. The method of claim 1, in which the step of actuating the abrasive element comprises withdrawal of the deployed abrasive element along the treatment zone.

9. The method of claim 1, comprising infusing the sclerosant agent into the lower limb superficial vein via outlets disposed on a sidewall of a distal end of the catheter device.

10. The method of claim 1, comprising delivering the sclerosant agent from an outlet of the catheter device as a pressurised jet optionally in a direction that is normal to a surface of the wall.

11. The method of claim 1, comprising an additional step of occluding the lower limb superficial vein or inducing vasospasm in the lower limb superficial vein at a distal location distant to the treatment zone prior to disruption of the wall at the treatment zone.

12. The method of claim 1, comprising an additional step of occluding the lower limb superficial vein or inducing vasospasm in the lower limb superficial vein at a distal location distant to the treatment zone prior to disruption of the wall at the treatment zone, in which the lower limb superficial vein being treated is a vein, and in which the distal location distant to the treatment zone is selected from the Great Saphenous Vein (GSV) of the lower limb and a junctional point with the deep venous circulation, including the saphenofemoral junction and junctions of perforator veins.

13. The method of claim 1, comprising delivering sclerosant to the lower limb superficial vein via the abrasive element of the catheter device which is located directly adjacent to the wall or in close proximity to the wall.

14. The method of claim 1, comprising infusing the sclerosant at or adjacent to a proximal end of the treatment zone, wherein the infused sclerosant tracks proximally across the treatment zone and penetrates the exposed subendothelial layers of the wall.

15. The method of claim 1, comprising reducing a volume of a lumen of the treatment zone of the lower limb superficial vein by deploying a volume occupying body in the lumen of the treatment zone to create a residual lumen, in which the infusion step comprises infusing sclerosant into the residual lumen, optionally in which the volume occupying body is an inflatable balloon.

16. The method of claim 1, including a step of infusing a physiological neutral solution into the treatment zone of the lower limb superficial vein after disruption of the wall and prior to or during the infusion of the sclerosant.

17. The method of claim 16, in which infusion of the sclerosant comprises withdrawing the catheter device proximally across the treatment zone while simultaneously infusing sclerosant along the treatment zone from a distal end of the catheter device and infusing physiological neutral solution along the treatment zone ahead of the infusion of sclerosant, optionally in which the sclerosant and saline are infused simultaneously.

18. The method of claim 1, including a step of recirculation of infused sclerosant by the catheter device to the treatment zone from a location in the lower limb superficial vein proximal to the treatment zone.

19. A method of treating venous reflux in a vein in a subject to cause thrombotic occlusion of the vein and subsequent fibrotic closure by the inflammatory response to endothelial and media layer disruption comprising delivering a stimulus to the vein to cause a treatment zone of the vein to venospasm along a full length of the treatment zone, and mechanically and circumferentially denuding the treatment zone of the vein during venospasm of the vein including disruption of the endothelial and medial layers of the superficial vein.

20. The method of claim 19, comprising infusing a sclerosant agent into the vein to contact and induce cellular necrosis in the exposed subendothelial layers of the wall.

21. A method of treating a varicose vein in a subject, comprising the steps of:
- advancing a catheter device comprising a deployable abrasive element distally across a treatment zone in the varicose vein;
- deploying the abrasive element at a distal end of the treatment zone into partial contact with a wall of the varicose vein;
- withdrawing the deployed abrasive element proximally along the treatment zone of the varicose vein to cause venospasm along a full length in the treatment zone;
- recapturing the abrasive element into a lumen of an elongated catheter;
- re-advancing the catheter device distally across the treatment zone in the varicose vein,
- re-deploying the abrasive element into full circumferential contact with the distal end of the treatment zone while it is in venospasm;
- withdrawing the re-deployed abrasive element proximally along the treatment zone of the varicose vein to cause disruption of a wall and exposure of subendothelial layers of the wall of the varicose vein at the treatment zone;
- infusing a sclerosant agent into the varicose vein via the catheter to contact and induce cellular necrosis in the exposed subendothelial layers of the wall of the varicose vein;
- recapturing the abrasive element by the catheter device; and
- withdrawing the catheter device from the varicose vein.

22. A method of treating a blood vessel in a subject, comprising the steps of:
- advancing a catheter device comprising a deployable abrasive element distally across a treatment zone in the vessel;
- deploying the abrasive element into contact with a vessel wall;
- actuating the abrasive element to cause disruption of the vessel wall and exposure of subendothelial layers of the vessel wall at the treatment zone;
- infusing a sclerosant agent into the blood vessel via the abrasive element to contact and induce cellular necrosis in the exposed subendothelial layers of the vessel wall;
- recapturing the abrasive element by the catheter device; and
- withdrawing the catheter device from the vessel.

23. A method of treating a varicose vein in a subject, comprising the steps of:
- advancing a catheter device comprising a deployable abrasive element distally across a treatment zone in the varicose vein;
- deploying the abrasive element into contact with a wall of the varicose vein;
- actuating the abrasive element to cause disruption of the wall of the varicose vein and exposure of subendothelial layers of the wall of the varicose vein at the treatment zone;
- infusing a sclerosant agent into the varicose vein via the catheter to contact and induce cellular necrosis in the exposed subendothelial layers of the wall of the varicose vein;
- recapturing the abrasive element by the catheter device; and
- withdrawing the catheter device from the varicose vein,
- comprising an additional step of occluding or inducing vasospasm in the varicose vein at a distal location distant to the treatment zone prior to disruption of the wall at the treatment zone, wherein the distal location distant to the treatment zone is selected from the Great Saphenous Vein (GSV) of a lower limb and a junctional point with the deep venous circulation.

24. A method of treating a blood vessel in a subject, comprising the steps of:
- advancing a catheter device comprising a deployable abrasive element distally across a treatment zone in the vessel;
- deploying the abrasive element into contact with a vessel wall;
- actuating the abrasive element to cause disruption of the vessel wall and exposure of subendothelial layers of the vessel wall at the treatment zone;
- infusing a sclerosant agent into the blood vessel via the catheter to contact and induce cellular necrosis in the exposed subendothelial layers of the vessel wall;
- recapturing the abrasive element by the catheter device; and
- withdrawing the catheter device from the vessel,
- in which the method comprises inducing vasospasm of the treatment zone of the vessel prior to disruption of the vessel wall by administering a mechanical stimulus to the vessel wall by the abrasive element of the catheter device, in which the mechanical stimulation of the vessel wall comprises manual compression on the skin with a user's hand to further engage the mechanical element with the vessel wall.

* * * * *